United States Patent
Lee et al.

(10) Patent No.: US 9,631,111 B2
(45) Date of Patent: Apr. 25, 2017

(54) PRIMERLESS BASE PAINTING COMPOSITION FOR PARTS OF VEHICLE, KIT COMPRISING THE SAME, PAINTED PARTS OF VEHICLE COMPRISING THE SAME AND METHOD FOR PAINTING AND VARNISHING PARTS OF VEHICLE USING THE SAME

(71) Applicants: HYUNDAI MOBIS CO., LTD., Seoul (KR); NOROO BEE Chemical Co., Ltd., Cheonan-si, Chungcheongnam-do (KR)

(72) Inventors: Jung Hwan Lee, Yongin-si (KR); Yong Chun, Yongin-si (KR); Ok Kim, Yongin-si (KR); Jae Boem Ahn, Anyang-si (KR); Yong Chul Lee, Cheonan-si (KR); Mi Hye Lee, Cheongju-si (KR); Seung Wook Baek, Cheonan-si (KR); Jeong Kwon Byeon, Yongin-si (KR); Seung Pyo Hong, Daegu (KR); Hoon Kwan Joo, Cheonan-si (KR)

(73) Assignees: HYUNDAI MOBIS CO., LTD., Seoul (KR); NOROO BEE Chemical Co., Ltd., Cheonan-si (KR)

( * ) Notice: Subject to any disclaimer, the term of this patent is extended or adjusted under 35 U.S.C. 154(b) by 366 days.

(21) Appl. No.: 14/296,291

(22) Filed: Jun. 4, 2014

(65) Prior Publication Data
US 2014/0363647 A1  Dec. 11, 2014

(30) Foreign Application Priority Data
Jun. 5, 2013 (KR) ........................ 10-2013-0065008

(51) Int. Cl.
*C09D 123/26* (2006.01)
*B05D 3/00* (2006.01)
(Continued)

(52) U.S. Cl.
CPC ........... *C09D 123/26* (2013.01); *B05D 3/142* (2013.01); *B05D 7/53* (2013.01); *C09D 151/06* (2013.01);
(Continued)

(58) Field of Classification Search
None
See application file for complete search history.

(56) References Cited

U.S. PATENT DOCUMENTS

2009/0041943 A1* 2/2009 Ogawa .................. B05D 7/572
427/385.5

FOREIGN PATENT DOCUMENTS

| CN | 101006147 A |   | 7/2007 |   |
|----|-------------|---|--------|---|
| JP | CN 101006147 A | * | 7/2007 | ............ C08F 255/00 |

OTHER PUBLICATIONS

Takeshi et al. (CN 101006147 A)—(Jul. 2007) (Google Patents—Machine Translation to English).*
(Continued)

*Primary Examiner* — David Sample
*Assistant Examiner* — Donald M Flores, Jr.
(74) *Attorney, Agent, or Firm* — Knobbe Martens Olson & Bear LLP

(57) ABSTRACT

The present invention relates to a primerless base painting composition for parts of a vehicle comprising a resin component including a non-chlorinated modified polyolefin resin and an acrylic resin; a pigment; additives; and a solvent selected from an aqueous solvent and an oil solvent, a kit
(Continued)

comprising the same, painted parts of a vehicle comprising the same, and a method for painting and varnishing parts of a vehicle using the same.

11 Claims, 2 Drawing Sheets

(51) Int. Cl.
*B05D 3/02* (2006.01)
*B05D 3/14* (2006.01)
*B05D 7/00* (2006.01)
*C09D 151/06* (2006.01)

(52) U.S. Cl.
CPC ............... *Y10T 428/24975* (2015.01); *Y10T 428/31938* (2015.04)

(56) References Cited

OTHER PUBLICATIONS

Office Action dated Feb. 3, 2016 of corresponding Chinese Patent Application No. 201410141050.1 an its English translation—9 pages.

\* cited by examiner

PRIMERLESS BASE PAINTING COMPOSITION FOR PARTS OF VEHICLE, KIT COMPRISING THE SAME, PAINTED PARTS OF VEHICLE COMPRISING THE SAME AND METHOD FOR PAINTING AND VARNISHING PARTS OF VEHICLE USING THE SAME

CROSS-REFERENCES TO RELATED APPLICATIONS

The present application claims priority under 35 U.S.C 119(a) to Korean Application No. 10-2013-0065008, filed on Jun. 5, 2013, in the Korean Intellectual Property Office, which is incorporated herein by reference in its entirety set forth in full.

BACKGROUND

Exemplary embodiments of the present invention relate to a primerless base painting composition for parts of a vehicle, a kit comprising the same, painted parts of a vehicle comprising the same, and a method for painting and varnishing parts of a vehicle using the same. More specifically, the present invention relates to a primerless base painting composition for the parts of a vehicle, a kit comprising the same, painted parts of a vehicle comprising the same, and a method for painting and varnishing parts of a vehicle using the same, which may keep physical properties of a paint film without a primer pre-treatment process at an equivalent or more and reduce the number of processes and save costs due to an absence of the primer pre-treatment process.

Parts of a vehicle are molded of polyolefin including polypropylene, and the like. Surfaces of Parts of a vehicle are painted and varnished with paints, and the like to improve an appearance and physical properties of the parts of a vehicle.

The typically painted parts of a vehicle are configured of a material for parts of a vehicle, a primer layer on the material for parts of a vehicle, a base coating layer on the primer layer, and a clear coating layer on the base coating layer. FIG. 2 is a cross-sectional view of typically painted parts of a vehicle. Referring to FIG. 2, the painted parts of a vehicle may include a material 10 for parts of a vehicle, a primer layer 40 on the material 10 for parts of a vehicle, a base coating layer 50 on the primer layer 40, and a clear coating layer 30 on the base coating layer 50. The base coating layer is a colored paint layer and the clear coating layer is a layer formed of a clear paint to provide a high gloss. A thickness of the primer layer may be 8 μm, a thickness of the base coating layer may be 20 μm, and a thickness of the clear coating layer may be 30 μm.

The material for parts of a vehicle is generally molded of polyolefin, including polypropylene, and the like. Generally, a polypropylene-based resin which is a non-polar material has been known as a material having poor adhesive property. Therefore, to increase the adhesion of the polypropylene-based resin, the primer layer is formed on the material for parts of a vehicle. The primer layer is essential to increase the adhesion between the material for parts of a vehicle and various coating layers and is generally made of a chlorinated polyolefin resin. The base coating layer is a coating layer which provides colors to the parts of a vehicle and includes an acrylic resin, a polyurethane resin, a pigment, and the like. The clear coating layer is to make an appearance of parts of a vehicle good, provide a high gloss to the parts of a vehicle, and enhance reliability of a paint film and includes an acrylic resin, a polyester resin, and a diisocyanate-based hardener including a 3-functional hexamethyldiisocyanate, and the like as a hardener.

As such, a method for painting and varnishing parts of a vehicle according to the related art performs three processes, that is, a process of forming the primer layer, a process of forming the base coating layer, and a process of forming the clear coating layer to cause an increase in process cost and a reduction in productivity and uses various volatile organic compounds for forming the primer layer including the chlorinated polyolefin resin, and the like to cause environmental issues.

SUMMARY

An embodiment of the present invention relates to a primerless base painting composition for parts of a vehicle capable of painting the parts of a vehicle without using a primer at the time of painting and varnishing the parts of a vehicle to save process costs and improve productivity of the parts for a vehicle and simplifying a working process.

Another embodiment of the present invention relates to an environmentally-friendly primerless base painting composition for parts of a vehicle which includes reduced volatile organic compounds (VOCs), reduced hazardous air pollutants (HAPs), and does not have chlorine.

Still another embodiment of the present invention relates to a method for painting and varnishing parts of a vehicle which uses a primerless base painting composition for parts of a vehicle.

In one embodiment, a primerless base painting composition for parts of a vehicle, includes: a resin component including a non-chlorinated modified polyolefin resin and an acrylic resin; a pigment; additives; and a solvent selected from an aqueous solvent and an oil solvent.

The non-chlorinated modified polyolefin resin may be modified to at least one of maleic acid and maleic anhydride.

The non-chlorinated modified polyolefin resin may be modified to at least one of a hydroxyl group and a carboxylic acid group.

The resin gradient may further include a water dispersible polyurethane resin.

The composition may include: 30 to 50 wt % of non-chlorinated modified polyolefin, 1 to 10 wt % of acrylic resin, 10 to 30 wt % of water dispersible polyurethane resin, 5 to 20 wt % of pigment, 0.1 to 10 wt % of additives, and 10 to 40 wt % of aqueous solvent.

The composition may include: 10 to 30 wt % of non-chlorinated modified polyolefin, 10 to 30 wt % of acrylic resin, 5 to 20 wt % of pigment, 0.1 to 10 wt % of additives, and 10 to 40 wt % of oil solvent.

In another embodiment, a kit for painting parts of a vehicle includes: a first gradient including the primerless base painting composition for parts of a vehicle; and a second gradient including a clear painting composition.

The clear painting composition may include at least one of acrylic resin and polyester and a polyisocyanate type hardener.

In still another embodiment, painted parts of a vehicle includes: a material for parts of a vehicle; a primerless base coating layer on the material for parts of a vehicle; and a clear coating layer on the primerless base coating layer, wherein the primerless base coating layer is made of the primerless base painting composition for parts of a vehicle.

The parts of a vehicle may include at least one of a bumper, a side sill moulding, a side garnish, and a side protector.

The material for parts of a vehicle may be polypropylene, a thickness of the primerless base coating layer may be 10 µm to 30 µm, and a thickness of the clear coating layer may be 25 µm to 40 µm.

In still yet another embodiment, a method for painting parts of a vehicle includes: forming a primerless base coating layer by applying the primerless base painting composition for parts of a vehicle to a material for parts of a vehicle; and forming and baking a clear coating layer by applying a clear painting composition on the primerless base coating layer.

The method for painting parts of a vehicle may further include: plasma-treating the material for parts of a vehicle prior to applying the primerless base painting composition for parts of a vehicle.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
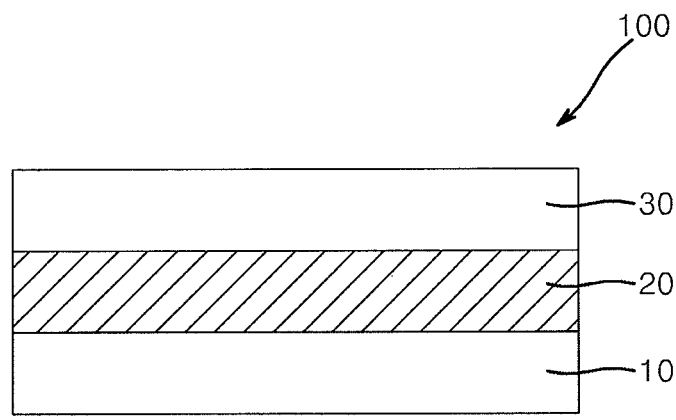
FIG. 1 is a cross-sectional view of painted parts of a vehicle according to an embodiment of the present invention.
Figure 2:
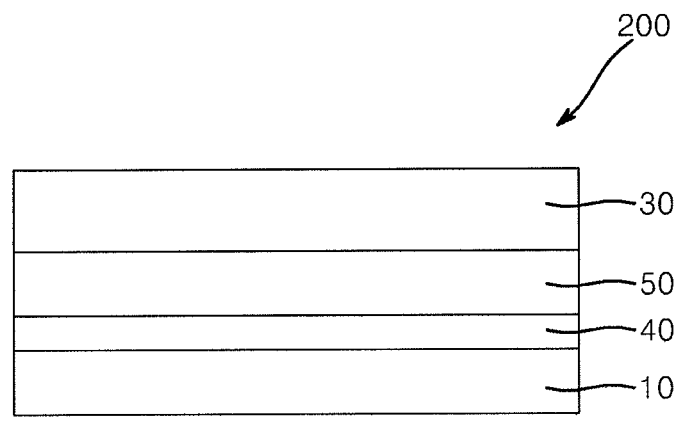
FIG. 2 is a cross-sectional view of typically painted parts of a vehicle.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In order to clearly describe the present invention, portions that are not connected with the description will be omitted. Like reference numerals designate like elements throughout the specification. Throughout the present specification, same or like components of the present invention will be described using same or like terms.

Hereinafter, exemplary embodiments of the present invention will be described in more detail.

A primerless base painting composition for parts of a vehicle according to an embodiment of the present invention includes a resin, a colored organic/inorganic pigment, additives, and a solvent, in which the resin may include a non-chlorinated modified polyolefin resin and an acrylic resin. The "parts of a vehicle" may include a part (bumper) of a vehicle, a side sill moulding, a side garnish, a side protector, and a body color painting and varnishing part including other polypropylene materials, but are not limited thereto. The material for parts of a vehicle may made of generally used materials and may include parts which are made of, for example, a thermoplastic polyolefin material including polypropylene, polyethylene, and the like.

The primerless base painting composition for parts of a vehicle according to the embodiment of the present invention is directly coated on the material for parts of a vehicle to paint and varnish the parts of a vehicle. In particular, the composition according to the embodiment of the present invention may increase an adhesion of the material for parts of a vehicle to the painting composition without performing a primer pre-treatment process on the existing material for parts of a vehicle, make an appearance of the parts of a vehicle good, and implement stable and reliable painting and varnishing. As a result, the primerless base painting composition for the parts of a vehicle according to the embodiment of the present invention may be coated on the material for parts of a vehicle to form a primerless base coating layer.

In particular, the primerless base painting composition for parts of a vehicle according to the embodiment of the present invention is subjected to a plasma processing process prior to performing a primer pre-treatment process in the existing plating and varnishing process and therefore may solve a problem of a deterioration of painting and varnishing which is caused by the occurrence of a section in which some of a surface of the parts of a vehicle is not subjected to the plasma processing.

The resin serves as a matrix for forming the primerless base coating layer at the time of coating the composition on the parts of a vehicle and is coated on the parts of a vehicle to serve as a base of the coating layer and may include a non-chlorinated modified polyolefin resin and an acrylic resin.

The non-chlorinated modified polyolefin resin provides polarity to the non-polar material for parts of a vehicle, for example, polypropylene to provide the adhesion of the composition or the clear coating layer composition to the material for parts of a vehicle, such that the painting and varnishing process is performed without performing the primer pre-treatment process on the parts of a vehicle, thereby simplifying a working process and improving productivity. To this end, according to the embodiment of the present invention, the non-chlorinated modified polyolefin resin is introduced with a polar group, in which the polar group may be introduced with, for example, a hydroxyl group, a carboxylic acid group, a polar functional group, and the like which is induced from acid anhydride including maleic anhydride, and the like.

The non-chlorinated modified polyolefin resin, which is a non-chlorinated resin which does not include chlorine, does not include chlorine like chlorinated polyolefin used for the existing primer layer and therefore may implement an environmentally-friendly effect.

Further, since the non-chlorinated polyolefin resin is modified to the maleic anhydride, the non-chlorinated modified polyolefin resin may have excellent compatibility at the time of being used together with other resins. The maleic anhydride modified polyolefin resin includes a form in which the maleic anhydride is grafted by heat treatment or chemical treatment. A graft rate is not limited, but may be a range of 1 to 20%, for example, 3 to 15%, for example, 1, 2, 3, 4, 5, 6, 7, 8, 9, 10, 11, 12, 13, 14, and 15%.

In the non-chlorinated modified polyolefin resin, the "polyolefin" may include high density polyolefin, low density polyethylene, polypropylene, and the like but is not limited thereto.

The non-chlorinated modified polyolefin resin has a weight average molecular weight which is in a range of 120,000 to 170,000 g/mol, for example, 120,000, 130,000, 140,000, 150,000, 160,000, and 170,000 g/mol as a polymer type resin for forming the primerless base coating layer. In the above range, the material for parts of a vehicle may be painted and varnished, stiffness of the primerless base coating layer may be increased, and the clear painting layer may be stably formed.

The non-chlorinated modified polyolefin resin may be included at 10 wt % or more, for example, 30 wt % or more, preferably, 10 to 30 wt % or more or 30 to 50 wt %, for example, 10, 11, 12, 13, 14, 15, 16, 17, 18, 19, 20, 21, 22, 23, 24, 25, 26, 27, 28, 29, and 30 wt % of the primerless base painting composition for parts of a vehicle. In the range, the non-chlorinated modified polyolefin resin may prevent the adhesion to the material for parts of a vehicle from reducing and increase the adhesion between the base coating layer and the clear paint coating layer.

The acrylic resin has high compatibility with the non-chlorinated modified polyolefin resin and therefore becomes a resin which may implement a uniform composition without phase separation from the non-chlorinated modified polyolefin resin within the painting composition. Further, the acrylic resin is a resin which has a good rheology control and is included in the painting composition, thereby providing excellent workability and paintability. Further, when an aluminum paste is used in a metallic paint, uniform culturability of silver particles may be increased.

The acrylic resin may include an acrylic monomer alone or a copolymer resin of acrylic monomer and another monomer which may be polymerized with the acrylic monomer. If the acrylic copolymer resin is an acrylic copolymer resin generally used in the painting and varnishing of the parts of a vehicle, any acrylic copolymer may be used without limit. In a detailed example, the acrylic resin may be at least one of an acrylic copolymer containing an alkyl group having C1 to C10, an acrylic copolymer containing a hydroxyl group and an alkyl group having C1 to C10, an acrylic copolymer containing an aromatic group having C6 to C20, an acrylic copolymer containing a carboxylic acid group, and an acrylic copolymer containing an aliphatic group having C5 to C20. The acrylic resin may have a weight average molecular weight of 25,000 to 100,000 g/mol. In the above range, the compatibility with the non-chlorinated modified polyolefin resin may be good and the stiffness of the coating layer may be secured.

The acrylic resin may be included at 30 wt % or less, for example, 1 to 30 wt %, preferably, 1 to 10 wt % or 10 to 30 wt %, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 wt % in the primerless base painting composition for parts of a vehicle. In the above range, the acrylic resin may secure excellent painting workability at the time of painting and good water-proofing due to a formation of a rigid paint film.

Only when the non-chlorinated modified polyolefin resin and the acrylic resin is included at an appropriate ratio, the adhesion of the primerless base painting composition for parts of, a vehicle to the material for parts of a vehicle may be increased and the water-proofing of the painting of parts of a finally manufactured vehicle may be increased. In a detailed example, non-chlorinated modified polyolefin resin: acrylic resin in the primerless base painting composition for parts of a vehicle may be included at a weight ration of 1:0.2 to 1:1, for example, a weight ratio of 1:0.2, 1:0.3, 1:0.4, 1:0.5, 1:0.6, 1:0.7, 1:0.8, 1:0.9, and 1:1. In the above range, the adhesion of the primerless base painting composition for parts of a vehicle to the material for parts of a vehicle and ally physical properties including the water-proofing may be secured.

In the case of an aqueous painting composition, the resin may further include a polyester resin and a water dispersible polyurethane resin in addition to the non-chlorinated modified polyolefin resin and the acrylic resin. The water dispersible polyurethane resin may be synthesized by reacting polyol with isocyanate. As the polyol which is used in the water dispersible polyurethane resin, acrylic polyol, polyester polyol, polycarbonate polyol, and the like may be used. Further, the water dispersible polyurethane resin may have pH of 7.5 to 8.5, a solid of 38 to 40%, and a viscosity of 50 to 500 mPas. The water dispersible polyurethane resin has good compatibility with the non-chlorinated modified polyolefin and the acrylic resin. The water dispersible polyurethane resin serves to form the rigid paint film in the primerless base painting composition for parts of a vehicle and improve physical properties such as water-proofing.

The water dispersible polyurethane resin may be included at 30 wt % or less, for example, 10 to 30 wt %, for example, 10, 11, 12, 13, 14, 15, 16, 17, 18, 19, 20, 21, 22, 23, 24, 25, 26, 27, 28, 29, and 30 wt % in the primerless base painting composition for parts of a vehicle. In the above range, the excellent workability may be shown at the time of painting and varnishing the parts of a vehicle.

The pigment provides colors, in particular, colored colors to the parts of a vehicle and may include pigments such as organic/inorganic colored pigment, aluminum-paste (Al-paste), pearl, and body pigment, which are generally used at the time of paining and varnishing the parts of a vehicle, in which the pigments may be used alone or may be used as at least two mixtures.

When the parts of a vehicle is painted and varnished with the excessive amount of pigment, the pigment may have an adverse affect on physical properties of the coating layer and therefore, the usage thereof needs to be limited. In a detailed example, the pigment may be included at 3 to 20 wt %, for example, 5 to 20 wt % and 3 to 15 wt % in the primerless base painting composition for parts of a vehicle. In the above range, when the pigment is used in the primerless base painting composition for parts of a vehicle, the pigment may hide the material, sufficiently implement colors, and does not affect the physical properties of the paint film.

The additives are added to the primerless base painting composition for parts of a vehicle in a predetermined content range and thus may implement an additional effect to implement wettability, leveling property, and the like at the time of painting. In a detailed example, as the additives, additives generally included in the primerless base painting composition for parts of a vehicle may be used. For example, the additives may include at least one of a wetting agent, a defoaming agent, a thickener, a photostabilizer, an adhesion promoter, a surface conditioner, a stain preventing agent, and a softener.

The wetting agent controls a surface tension of the primerless base painting composition for parts of a vehicle to improve the wettability and the leveling property of the paint film at the time of painting and may be included at 0.5 to 3 wt % in the primerless base painting composition for parts of a vehicle. In the above range, the wettability and the leveling property of the paint film may be improved. The defoaming agent which is a mixture of pro-fluid and polysiloxane breaks bubbles generated at the time of painting to improve an appearance of the paint film and may be included at 0.1 to 1.5 wt % in the primerless base painting composition for parts of a vehicle. In the above range, the defoaming agent suppresses the occurrence of bubbles at the time of painting to improve the appearance. The thickener controls the viscosity of painting composition and provides thixotropic property to prevent a flow of painting composition at the time of painting and may be included at 0.1 to 1 wt % in the painting composition. In the above range, the thickener may prevent the flow of painting composition at the time of painting. The thickener is mainly used in the aqueous paint and the aqueous painting composition may have a viscosity of 700 to 1300 cPc at 25° C. In the above range, the thickener has an appropriate viscosity and thus may be coated on the material for parts of a vehicle. The photostabilizer which is an ultraviolet absorber is to improve a weather resistance of the paint film and may be included at 0.5 to 3 wt % in the painting composition. In the above range, the photostabilizer may improve the weather resistance of the paint film. The adhesion promoter is to mainly increase the adhesion of the painting composition when the adhesion promoter is used at an appropriate content within the metallic paint and may be included at 0.5 to 3 wt % in the painting composition. In the above range, the adhesion promoter may increase the adhesion and prevent silver from being oxidized. The surface conditioner controls the surface tension of the primerless base painting composition for parts of a vehicle to improve the wettability and the leveling property of the paint film at the time of painting and may be included at 0.1 to 1.5 wt % in the primerless base painting composition for parts of a vehicle. In the above range, the wettability and the leveling property of the paint film may be improved. The stain preventing agent is to suppress the occurrence of stain at the time of forming the paint film by uniformly arranging the pigment, in particular, the silver particles at the time of painting and may be included at 0.1 to 10 wt %, for example, 0.1 to 1 wt % or 1 to 10 wt % in the painting composition. In the above range, the stain preventing agent may suppress the occurrence of stain at the time of forming the paint film. The softener is to reduce the occurrence of cracks within the dried paint film and may be included at 0.5 to 5 wt % in the painting composition. In the above range, the softener reduces the occurrence of cracks within the dried paint film to make impact resistance and bending resistance good.

The additives may be included at 0.1 to 10 wt % in the primerless base painting composition for parts of a vehicle. In the above range, the primerless base painting composition for parts of a vehicle may prepare the painting composition without being affected by the action of non-chlorinated modified polyolefin resin and acrylic resin.

The painting composition may include a predetermined solvent to coat the parts of a vehicle. The solvent may facilitate the painting working and improve smoothness of the paint film.

As the solvent, the aqueous solvent including distilled water, deionized water, and the like and at least one of a saturated or unsaturated hydrocarbon (including C1 to C20)-based oil solvent, an alcohol-based oil solvent, a ketone-based oil solvent, an ester-based oil solvent may be used. For example, the solvent may be included at 10 to 40 wt % in the painting composition. In the above range, the solvent may facilitate the painting working and improve the smoothness of the paint film.

The use solvent may be divided to meet the characteristics of the aqueous painting composition and the oil painting composition.

In a detailed example, a solid aqueous painting composition including the organic/inorganic colored pigment and the aqueous solvent may include 30 to 50 wt % of non-chlorinated modified polyolefin, 1 to 10 wt % of acrylic resin, 10 to 30 wt % of water dispersible polyurethane resin, 5 to 20 wt % of organic colored pigment, 0.5 to 3 wt % of wetting agent, 0.1 to 1.5 wt % of defoaming agent, 0.1 to 1 wt % of thickener, 0.5 to 3 wt % of photostabilizer, and 10 to 40 wt % of aqueous solvent.

In another detailed example, the metallic aqueous painting composition including the organic/inorganic colored pigment including aluminum-paste or pearl and the aqueous solvent may include 30 to 50 wt % of non-chlorinated modified polyolefin, 10 to 30 wt % of acrylic resin, 10 to 30 wt % of water dispersible polyurethane resin, 3 to 15 wt % of organic colored pigment, 0.5 to 3 wt % of wetting agent, 0.1 to 1.5 wt % of defoaming agent, 0.1 to 1 wt % of thickener, and 10 to 40 wt % of aqueous solvent.

In another detailed example, a solid oil painting composition including the organic/inorganic colored pigment and the oil solvent may include 10 to 30 wt % of non-chlorinated modified polyolefin, 10 to 30 wt % of acrylic resin, 5 to 20 wt % of organic colored pigment, 0.1 to 1.5 wt % of surface conditioner, 0.1 to 1 wt % of stain preventing agent, 0.5 to 5 wt % of softener, and 10 to 40 wt % of oil solvent.

In another detailed example, the metallic oil painting composition including the organic/inorganic colored pigment including aluminum-paste or pearl and the oil solvent may include 40 to 80 wt % of non-chlorinated modified polyolefin, 10 to 30 wt % of acrylic resin, 3 to 20 wt % of inorganic colored pigment, 0.5 to 3 wt % of adhesion promoter, 0.1 to 1.5 wt % of surface conditioner, 1 to 10 wt % of stain preventing agent, and 10 to 40 wt % of oil solvent.

The primerless base painting composition for parts of a vehicle according to the embodiment of the present invention may have a specific gravity of 0.9 to 1.5, for example, 0.9 to 1.2 at 25° C.

The primerless base painting composition for parts of a vehicle according to the embodiment of the present invention may have pH of 6.0 to 10.0 at 25° C. In the above range, the primerless base painting composition for parts of a vehicle may secure storage stability of paint.

The primerless base aqueous painting composition for parts of a vehicle according to the embodiment of the present invention may have a viscosity of 700 to 1300 cPS based on CPS (B-sp#3) at 60 rpm and 20° C. When the viscosity is less than 700 Cps, sagging may occur at the time of painting during the working and when the viscosity exceeds 1300 cPS, the surface leveling may be reduced.

The primerless base oil painting composition for parts of a vehicle according to the embodiment of the present invention may have a viscosity of 50 to 70 KU based on a KU viscometer [KU (Krebs Unit), ASTM D562] at 25° C. In the above range, the primerless base oil painting composition for parts of a vehicle may secure the storage stability of paint. In the case of the oil painting composition, a dilute solvent is used at the time of painting and the painting viscosity may be 12 to 20 sec based on F.C#4 at 25° C. When the painting viscosity is less than 12 sec, sagging may occur at the time of painting during the working and when the painting viscosity exceeds 20 sec, the surface spray painting is difficult and the leveling may be reduced.

A non-volatile (NV) ingredient of the primerless base painting composition for parts of a vehicle according to the embodiment of the present invention may have 15 to 50 wt %. For example, the aqueous painting composition including the aqueous solvent may have 20 to 30 wt % of NV or 25 to 40 wt % of NV and the oil painting composition including the oil solvent may have 15 to 30 wt % of NV or 20 to 50 wt % of NV.

A kit for painting and varnishing parts of a vehicle according to another embodiment of the present invention may include a first gradient including the primerless base painting composition for parts of a vehicle and a second gradient including a clear painting composition. The primerless base painting composition for parts of a vehicle and the clear painting composition are separated from each other and are included in one kit to be used for painting and varnishing of parts of a vehicle.

The detailed contents of the primerless base painting composition for parts of a vehicle are already described.

The clear painting composition serves as a passivation layer of the coating layer made of the painting composition coated on the material for parts of a vehicle and provides gloss, improves the appearance, or enhances the reliability of the paint film. The clear painting composition may be coated on the material for parts of a vehicle to form a clear coating layer.

The clear painting composition includes at least one of acrylic resin and polyester as a main gradient and may also include a polyisocyanate type hardener as a hardener, for example, 3-functional hexamethyldiisocyanate.

The parts of a vehicle according to another embodiment of the present invention may include the primerless base coating layer made of the primerless base painting composition for parts of a vehicle.

FIG. 1 is a cross-sectional view of painted parts of a vehicle according to an embodiment of the present invention. Referring to FIG. 1, the painted parts 100 of a vehicle includes a material for parts of a vehicle 10 includes a material 10 for parts of a vehicle, a primerless base coating layer 20 on the material 10 for parts of a vehicle, and a clear coating layer 30 on the primerless base coating layer 20, in which the primerless base coating layer 20 may be made of the primerless base painting composition for parts of a vehicle according to the embodiment of the present invention.

In the present specification, "upper portion" or "lower portion" is defined based on the drawings and thus depending on a viewing angle, the "upper portion" may be changed to the "lower portion" or the "lower portion" may be changed to the "upper portion".

The material for parts of a vehicle and the primerless base coating layer in the painted parts of a vehicle directly contact each other and a primer layer, an adhesive layer, a coating layer, and the like may not be disposed between the material for parts of a vehicle and the primerless base coating layer.

A thickness of the primerless base coating layer may be 10 μm to 30 μm, for example, 20 μm and a thickness of the clear coating layer may be 25 μm to 40 μm, for example, 30 μm.

The method for painting and varnishing parts of a vehicle according to another embodiment of the present invention may include the following processes.

The method for painting and varnishing parts of a vehicle may include forming the primerless base coating layer by applying the primerless base painting composition for parts of a vehicle to the material for parts of a vehicle and forming and baking the clear coating layer by applying the clear painting composition on the primerless base coating layer.

In the painting of the parts of a vehicle according to the related art, pre-treating the material for parts of a vehicle with primer is an essential process. The reason is that polyolefin which is the material for parts of a vehicle has the low adhesion to the paint and therefore may increase the adhesion to the paint only by pre-treating the primer. Generally, the primer layer is formed on the material for parts of a vehicle at a thickness of 5 to 15 μm.

The primerless base painting composition for parts of a vehicle according to the embodiment of the present invention may improve the adhesion due to the existing primer, simultaneously with providing and maintaining colors due to a colored pigment. As the result, even though the painting method according to the embodiment of the present invention does not include the primer pre-treatment process, the adhesion and color effect for the paint of the material of parts of a vehicle may be simultaneously achieved by applying the painting composition without performing the primer treatment on the material for parts of a vehicle. That is, the painting method according to the embodiment of the present invention adds the primer pre-treatment function during the process of forming a base coating layer, instead of ruling out the existing primer pre-treatment process to integrate the functions, thereby shortening the process.

The applying of the primerless base painting composition for parts of a vehicle may be performed by a typical method. For example, the painting method supplies the primerless base painting composition for parts of a vehicle to a paining gun of a painting robot and may paint the parts of a vehicle whenever the parts of a vehicle pass.

The primerless base painting composition for parts of a vehicle may be applied at a thickness of 10 μm to 30 μm. In the above range, the adhesion even to the material for parts of a vehicle which is not subjected to the primer pre-treatment may be good and the colors are clearer and therefore it is possible to prevent the problem of the appearance badness. The thickness of the so formed primerless base coating layer may be 10 μm to 30 μm.

The painting method may form the primerless base coating layer by applying and drying the primerless base painting composition for parts of a vehicle, but further includes the baking process to more increase the stiffness and adhesion of the primerless base coating layer. The baking process may be performed at 70 to 90° C. for 5 to 60 minutes. In the above range, the rigid paint film may be formed by a urethane hardening reaction of resin within the painting composition.

Prior to coating the primerless base painting composition for parts of a vehicle on the material of parts of a vehicle, the painting method may further include cleaning the material for parts of a vehicle or plasma-treating the material for parts of a vehicle. The primerless base painting composition for parts of a vehicle may be applied at a uniform thickness by cleaning the material for parts of a vehicle, the adhesion of the primerless base painting composition for parts of a vehicle and the appearance after the painting may be improved, and the adhesion may be obtained by the plasma treatment.

The cleaning may be preformed by a typical method, for example, a wiping method using, for example, isopropyl alcohol (IPA), a hydrocarbon-based pre-treating agent, and the like.

The plasma treatment may be performed by a typical method, for example, a method for performing plasma treatment while removing moisture by discharging atmospheric pressure plasma generated from inert gas or reactive gas to the material for parts of a vehicle or a method for jetting plasma generated by a plasma burner to the material for parts of a vehicle.

After the primerless base coating layer is formed, the clear painting composition is applied on the primerless base coating layer.

The clear painting composition may be painted and varnished at a thickness of 25 μm to 40 μm. In the above range, weather resistance, water-proofing, chemical resistance, and environment resistance may be good. As the result, the formed clear coating layer may have a thickness of 25 μm to 40 μm.

After the clear paint is applied, the material for parts of a vehicle is baked. In the baking, the primerless base painting composition for parts of a vehicle applied on the parts of a vehicle and the clear painting composition may be heated and hardened.

The baking may be performed at 70 to 90° C. for 5 to 60 minutes. In the above range, the rigid paint film may be formed by the hardening reaction of resin within the painting composition. The baking may be performed at 80° C. for 30 minutes.

Hereinafter, a configuration and an action of the embodiment of the present invention will be described with reference to preferred Examples of the present invention. However, this is proposed as a preferred example of the present invention and therefore the present invention need not be construed as being limited thereto.

TABLE 1

| Gradient | Compound | Example 1 | Comparative Example 1 | Comparative Example 2 | Comparative Example 3 |
|---|---|---|---|---|---|
| RESIN | Non-chlorinated modified polyolefin (ADHESION PROMOTER 550-1, EASTMAN CHEMICAL) | 30.0 | 0 | 20 | 55.5 |
| | Acrylic resin (PICOTEX-100, EASTMAN CHEMICAL) | 25.0 | 55.5 | 35.5 | 0 |
| Pigment | Back pigment (CARBON MA-100, MITSUBISHI) | 3.0 | 3.0 | 3.0 | 3.0 |
| | PEARL (IRIODIN 9504 RED WR, MERCK) | 0.5 | 0.5 | 0.5 | 0.5 |
| Additives | Adhesion promoter [FREE ACID OF A COMPLEX CARBOXY PHOSPHATE ESTER (LUBRIZOL 2063, NOVEON DIVISION LUVRIZOL)] | 0.5 | 0.5 | 0.5 | 0.5 |
| | Surface conditioner [Mixture (BYKETOL SPECIAL, BYK) of aromatic solvent having a high boiling point, ketone-based solvent, and ester-based solvent and polysiloxane)] | 1.2 | 1.2 | 1.2 | 1.2 |
| | Stain Preventing Agent[MICROGEL(N5-1022, DPI)] | 1.0 | 1.0 | 1.0 | 1.0 |
| | Softener [POLYTETRAMETHYLENE ETHER GLYCOL(Q9-3301, DPI)} | 3.7 | 3.7 | 3.7 | 3.7 |
| Solvent | Oil solvent (TOLUENE, GS Caltex Inc.)(ISO PROPYL ALCOHOL, SHELL)(MEK, SHELL) | 35.1 | 34.6 | 34.6 | 34.6 |

TABLE 2

| | Composition | Example 2 | Comparative Example 4 | Comparative Example 5 | Comparative Example 6 |
|---|---|---|---|---|---|
| Resin | Non-chlorinated modified polyolefin (AUROREN S-6375, Japanese Paper) | 45.2 | 0 | 54.7 | 60.9 |
| | Acrylic resin (ALBERDINGK AC 2503, ALBERDINGK BOLEY) | 9.5 | 32.1 | 0 | 9.5 |
| | Water dispersible polyurethane resin (ALBERDINGK U5200 VP, ALBERDINGK BOLEY) | 15.7 | 38.3 | 15.7 | 0 |
| Pigment | Black pigment (CARBON MA-100, MITSUBISHI) | 0.2 | 0.2 | 0.2 | 0.2 |
| | Aluminum paste (AL-PASTE MH-8801, ASAHI) | 3.5 | 3.5 | 3.5 | 3.5 |
| Additives | Wetting agent Polyether siloxane copolymer (TEGO WET 280, Evonik) | 0.8 | 0.8 | 0.8 | 0.8 |
| | Defoaming agent (Surfynol DF-37, Air Products) | 0.5 | 0.5 | 0.5 | 0.5 |
| | Thickener Urethane thickener (ADEKANOL UH-814N, Ukjeon Chemicals Inc.) | 0.5 | 0.5 | 0.5 | 0.5 |
| | Photostabilizer UV HALS (Tinuvin 123DW, BASF) UV Absorb (Tinuvin 477DW, BASF) | 1.5 | 1.5 | 1.5 | 1.5 |
| Solvent | Aqueous solvent ARCOSOLV-PM (Hannong Chemicals Inc.) Deionized water | 22.6 | 22.6 | 22.6 | 22.6 |

The above Table 1 shows Example 1, Comparative Example 1, Comparative Example 2, and Comparative 3 of the oil painting composition, the above Table 2 shows Example 2, Comparative Example 4, Comparative Example 5, and Comparative Example 6, and the following tests were performed.

The parts of a vehicle of HR580E or HR580 material which is a polyolefin (TPO, thermoplastic polyolefin) material was cleaned with isopropylalcohol, and then each painting composition prepared to have the composition shown in the above Table 1 was painted and varnished at a thickness of 10 to 30 μm, painted with the clear paint (clear) at normal temperature after 5 to 10 minutes, and dried and baked (heat treated) at 80° C. for 30 minutes after 5 to 10 minutes.

The aqueous painting composition shown in the above Table 2 was subjected to the same method as described above except that the aqueous painting composition was painted and varnished at a thickness of 10 to 30 μm and then additionally baked at 80° C. for 10 minutes.

The painting workability, the adhesion, the acid resistance, the alkali resistance, the water-proofing, and the accelerated weather resistance of the paint of the painted parts of a vehicle were evaluated based on the primerless painting composition of the above Example and Comparative Example.

<Painting Workability>

The painting workability was evaluated at 0 to 5 points depending on the spreadability of paint sprayed when the painting of paint is performed by a spray type and the paint is painted and varnished on the object and the appearance level at which the paint film is smoothly formed. The higher score means that the painting workability is excellent.

<Initial Adhesion>

The adhesion makes a checkered plate by drawing 11 lines on the painted parts of a vehicle at an interval of 2 mm in width and length. The number of gradations on the paint film which is tightly adhered with an acrylic tape and then is strongly pulled at 90° to be stripped was measured. This was measured three times or more. This is called the checkered gradation adhesion test and as the number of gradations stripped from a total of 100 checkered gradations is increased, it was evaluated that the adhesion is poor.

<Acid Resistance>

The surface of the paint film of the painted parts of a vehicle was dropped with 0.2 ml of hydrochloric acid of 0.1N regulation and washed after being left at normal temperature for 24 hours and the surface state of the paint film was checked. It was evaluated whether the paint film is remarkably discolored, faded, swollen, and split and has reduced gloss, the coating of the paint film is exposed, and the like. The paint film was evaluated at 0 to 5 points depending on the level and the higher score means that the acid resistance is excellent due to the formation of rigid paint film.

<Alkali Resistance>

The surface of the paint film of the painted parts of a vehicle was dropped with 0.2 ml of sodium hydroxide solution of 0.1N regulation and washed after being left at normal temperature for 24 hours and the surface state of the paint film was checked. Likewise the acid resistance, it was evaluated whether the paint film is remarkably discolored, faded, swollen, and split and has reduced gloss, the coating of the paint film is exposed, and the like. The alkali resistance was evaluated at 0 to 5 points depending on the level and the higher score means that the alkali resistance is excellent.

<Water-Proofing>

The water-proofing was evaluated by the same method as a method to check the appearance and evaluate the adhesion after the painted sample is put in water of 40° C. and is left for 10 days. It was evaluated whether the paint film is remarkably discolored, faded, swollen, and split and has reduced gloss and reduced adhesion.

<Accelerated Weather Resistance>

It was evaluated whether the paint film is remarkably discolored, faded, swollen, and split, has reduced gloss, and the like by irradiating the painted sample using zenon arc defined in WWATHER-O-METER (ISO 105, JIS L 0843, ASTM D 6695, SAE J 1960, SAE J 2527 under the condition of the following Table 3 and then observing the surface state of the test sample and whether the adhesive is reduced by testing the adhesion.

TABLE 3

| Set condition | BLACK PNL temperature | Cycle | Irradiation illumination |
|---|---|---|---|
| 2500 KJ/m² [340 nm] | 70 ± 2° C. (LIGHT) 38 ± 2° C. (DARK) | Irradiation for 40 minutes (50 ± 5% RH) Irradiation for 20 minutes (Surface SPRAY) Irradiation for 60 minutes (50 ± 5% RH) Non-irradiation for 60 minutes (95 ± 5% RH, front surface/rear surface SPRAY) | 0.55 ± 0.02 W/ (m² · nm) [340 nm] |

TABLE 4

| | | Example 1 | Comparative Example 1 | Comparative Example 2 | Comparative Example 3 |
|---|---|---|---|---|---|
| Painting workability | | 5 | 5 | 5 | 2 |
| Initial adhesion | | 100/100 | 0/100 | 95/100 | 100/100 |
| Acid resistance | | 5 | 0 | 5 | 5 |
| Alkali resistance | | 5 | 0 | 5 | 5 |
| Water-proofing | Appearance | 5 | 0 | 4 | 4 |
| | Adhesion | 100/100 | 0/100 | 92/100 | 80/100 |
| Accelerated weather resistance | Appearance | 5 | 0 | 5 | 3 |
| | Adhesion | 100/100 | 0/100 | 95/100 | 100/100 |

TABLE 5

| | Example 2 | Comparative Example 4 | Comparative Example 5 | Comparative Example 6 |
|---|---|---|---|---|
| Painting workability | 5 | 5 | 3 | 5 |
| Initial adhesion | 100/100 | 0/100 | 100/100 | 100/100 |
| Acid resistance | 5 | 0 | 5 | 4 |
| Alkali resistance | 5 | 0 | 5 | 5 |
| Water-proofing Appearance | 5 | 0 | 5 | 3 |
| Water-proofing Adhesion | 100/100 | 0/100 | 100/100 | 80/100 |
| Accelerated weather resistance Appearance | 5 | 0 | 5 | 5 |
| Accelerated weather resistance Adhesion | 100/100 | 0/100 | 100/100 | 100/100 |

As shown in the above Tables 4 and 5, in the case of using the primerless base aqueous/oil painting composition shown in Examples 1 and 2, it may confirmed that all the physical properties such as painting workability, adhesion, acid resistance, alkali resistance, water-proofing, and accelerated weather resistance are most excellent.

According to the embodiments of the present invention, it is possible to improve the productivity at the time of manufacturing the parts of a vehicle by ruling out the primer painting and varnishing process, simplify the process from three coating-one-time baking process to two-time coating-one-time baking process, and reduce the painting and varnishing facility by ruling out the use of the primer and omitting the primer section from the existing painting and varnishing line. Further, it is possible to save costs by ruling out the use of the primer, save the facility, manpower, management costs by ruling out the primer painting and varnishing process from the existing painting and varnishing line and suppress the environmental pollution and suppress the emission of the hazardous air pollutants by including the non-chlorinated resin.

The simple modifications and changes of the present invention may be easily practiced by those skilled in the art and therefore it is to be construed that these modifications or changes are included in the scope of the present invention.

What is claimed is:

1. A vehicle part, comprising:
   a body of the vehicle part comprising a surface which comprises polypropylene;
   a colored coating layer formed on the surface and comprising a pigment, a non-chlorinated modified polyolefin resin and an acrylic resin, wherein the non-chlorinated modified polyolefin resin comprises at least one polar substituent group but does not comprise chlorine atoms, wherein no primer layer is inserted between the surface of polypropylene and the colored coating layer; and
   a clear coating layer directly formed on the colored coating layer.

2. The vehicle part of claim 1, wherein the non-chlorinated modified polyolefin resin comprises at least one moiety of maleic acid and maleic anhydride as the at least one polar substituent group.

3. The vehicle part of claim 1, wherein the non-chlorinated modified polyolefin resin comprises a hydroxyl group and a carboxylic group as the at least one polar substituent group.

4. The vehicle part of claim 1, wherein the colored coating layer further includes a water dispersible polyurethane resin.

5. The vehicle part of claim 1, wherein the colored coating layer comprises:
   the non-chlorinated modified polyolefin in 30 to 50 wt % of the coating layer;
   the acrylic resin in 1 to 10 wt % of the coating layer;
   the pigment in 5 to 20 wt % of the coating layer.

6. The vehicle part of claim 1, wherein the colored coating layer comprises:
   the non-chlorinated modified polyolefin in 10 to 30 wt % of the coating layer; the acrylic resin in 10 to 30 wt % of the coating layer;
   the pigment in 5 to 20 wt % of the coating layer.

7. The vehicle part of claim 1, wherein the clear coating layer comprises a polyisocyanate type hardener and at least one of acrylic resin and polyester.

8. The vehicle part of claim 1, wherein the vehicle part is selected from the group consisting of a bumper, a side sill moulding, a side garnish, and a side protector.

9. The vehicle part of claim 1, wherein the color coating layer has a thickness of 10 μm to 30 μn, and wherein the clear coating layer has a thickness of 25 μm to 40 μm.

10. A method of making the vehicle part of claim 1, the method comprising:
    providing the body comprising the surface comprising polypropylene;
    forming the colored coating layer on the surface without forming a primer layer between the surface and the colored coating layer; and
    forming the clear coating layer on the colored coating layer.

11. The method of claim 10, further comprising:
    plasma-treating the surface prior to forming the colored coating layer.

* * * * *